(12) United States Patent
Joo et al.

(10) Patent No.: US 6,277,324 B1
(45) Date of Patent: Aug. 21, 2001

(54) APPARATUS FOR MANUFACTURING MOLTEN PIG IRON AND REDUCED IRON BY UTILIZING A FLUIDIZED BED

(75) Inventors: Sang Hoon Joo; Sang Deuk Lee; Myoung Kyun Shin; Jun Hyuk Lee; Min Young Cho; Hang Goo Kim; Heung Won Kang, all of Kyungsangbook-do (KR)

(73) Assignees: Pohang Iron & Steel Co. LTD; Research Institute of Industrial Science & Technology, both of Kyungsanbook-do (KR); Voest-Alpine Industrieanlagenbau GmbH, Linz (AT)

( * ) Notice: Subject to any disclaimer, the term of this patent is extended or adjusted under 35 U.S.C. 154(b) by 0 days.

(21) Appl. No.: 09/367,907
(22) PCT Filed: Dec. 18, 1998
(86) PCT No.: PCT/KR98/00438
    § 371 Date: Aug. 19, 1999
    § 102(e) Date: Aug. 19, 1999
(87) PCT Pub. No.: WO99/32668
    PCT Pub. Date: Jul. 1, 1999

(30) Foreign Application Priority Data

Dec. 20, 1997 (KR) .................................................. 97-71434
Nov. 12, 1998 (KR) .................................................. 98-48452

(51) Int. Cl.[7] .................................................. C21B 13/02
(52) U.S. Cl. .................. 266/142; 266/156; 266/172; 266/217
(58) Field of Search .................................. 266/172, 156, 266/157, 216, 217, 142

(56) References Cited

U.S. PATENT DOCUMENTS

| | | | |
|---|---|---|---|
| 4,978,387 | 12/1990 | Kepplinger | 75/445 |
| 5,192,486 | 3/1993 | Whipp | 266/156 |
| 5,501,721 | 3/1996 | Edlinger | 75/434 |
| 5,785,733 | * 7/1998 | Lee et al. | 75/444 |

FOREIGN PATENT DOCUMENTS

| | | |
|---|---|---|
| 1167368 | * 4/1964 | (DE) . |
| WO9101799 | 2/1991 | (WO) . |
| WO9417214 | 8/1994 | (WO) . |
| 9801585 | * 1/1998 | (WO) . |

OTHER PUBLICATIONS

English translation of DE 1,167,368 to Walde, Apr. 4, 1964.*

* cited by examiner

Primary Examiner—Roy King
Assistant Examiner—Tima McGuthry Banks
(74) Attorney, Agent, or Firm—Webb Ziesenheim Logsdon Orkin & Hanson, P.C.

(57) ABSTRACT

An apparatus and a method for manufacturing molten pig iron by using a fine iron ore are disclosed. Coal is used to produce a reducing gas, and a fine iron ore is used to produce a molten iron and a reduced iron in a simple and efficient manner. The apparatus for manufacturing a molten iron by directly using coal as the fuel is as follows. A high temperature reducing gas is sent from a melter-gasifier to a fluidized bed lime stone calcining furnace to calcine the lime stone. The reducing gas is supplied to a second fluidized bed reducing furnace so as to manufacture a reduced iron directly. An off-gas from the second fluidized bed reducing furnace is supplied to a first fluidized bed reducing furnace (disposed above the second fluidized bed reducing furnace) to pre-heat and pre-reduce the fine iron ore. The calcined lime stone and the finally reduced iron are supplied to a melter-gasifier to manufacture a molten pig iron.

8 Claims, 5 Drawing Sheets

FIG. 1

PRIOR ART

FIG. 2

PRIOR ART

APPARATUS FOR MANUFACTURING MOLTEN PIG IRON AND REDUCED IRON BY UTILIZING A FLUIDIZED BED

CROSS-REFERENCE TO RELATED APPLICATION

This application is the national phase of PCT No. PCT/KR98/00438 filed Dec. 18, 1998 and corresponds to Korean Application Nos. 1997/71434 filed Dec. 20, 1997 and 1998/48452 filed Nov. 12, 1998.

FIELD OF THE INVENTION

The present invention relates to an apparatus for manufacturing molten pig iron and directly reduced iron by using a fine iron ore, and a method for manufacturing the molten pig iron by using the apparatus.

BACKGROUND OF THE INVENTION

U.S. Pat. No. 4,978,387 discloses a typical method for manufacturing molten pig iron using raw iron ore and coal without carrying out pre-treatments.

According to this U.S. patent, a raw iron ore and coal are directly used, so that pre-treating steps such as sintering and coking can be skipped unlike in the other blast furnaces, thereby simplifying the process steps and the manufacturing facilities.

Figure 1:
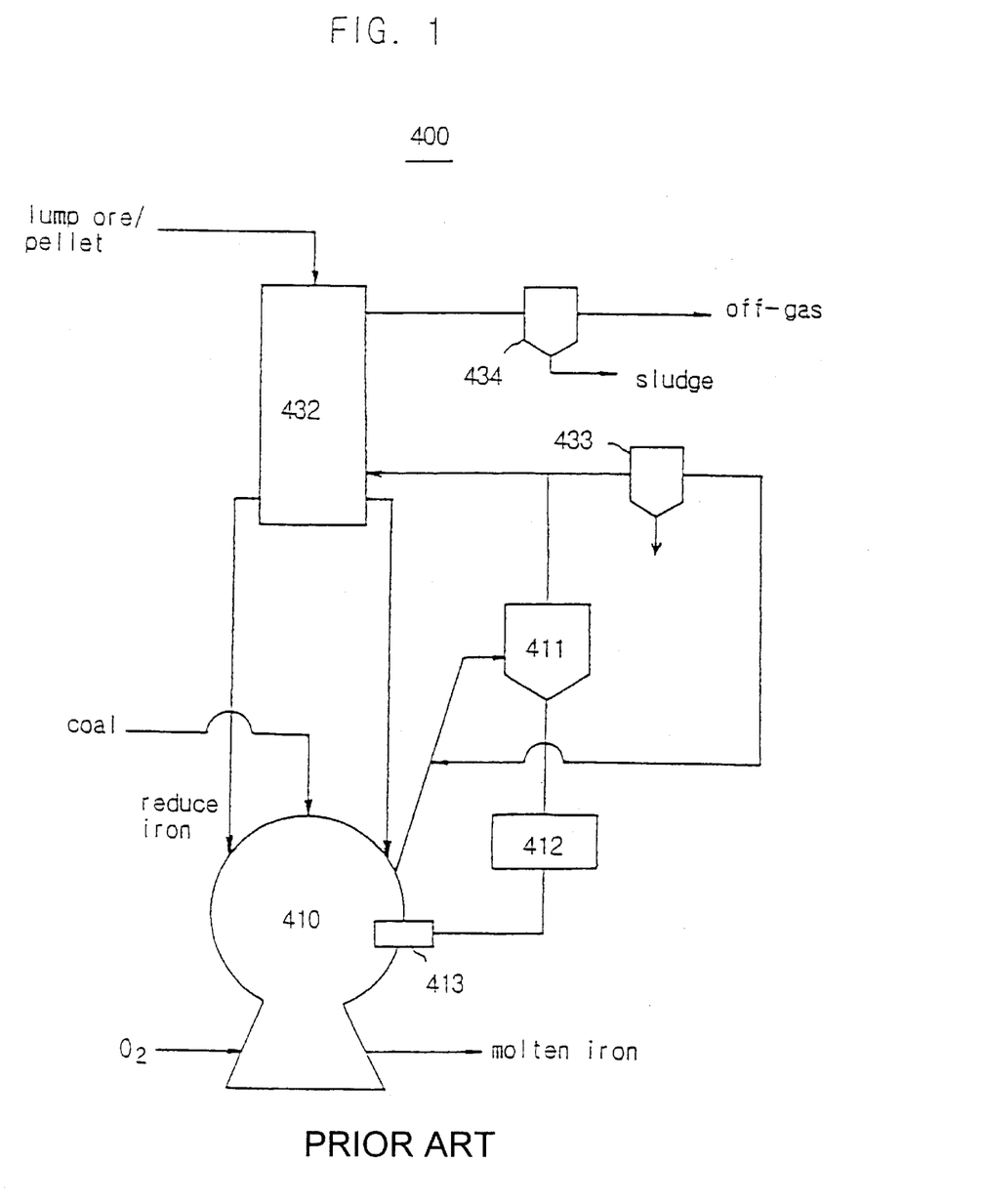
FIG. 1 is a schematic illustration of a conventional molten iron manufacturing apparatus.

As illustrated in FIG. 1, the apparatus 400 of U.S. Pat. No. 4,978,387 includes: a melter-gasifier 410 for gasifying the coal and for melting a reduced iron; a packed bed type Dre-reducing furnace 432 for indirectly reducing the iron ore by using a reducing gas produced by the melter-gasifier 410; and other auxiliary facilities.

The auxiliary facilities include: a cyclone 411, a recycling device 412, a melter-calciner 413, and venturi scrubbers 433 and 434.

Within the melter-gasifier 410, the coal is gasified to produce a reducing gas for indirectly reducing the iron ore. Further, it utilizes the generated heat to melt the reduced iron which has been indirectly reduced by the pre-reducing furnace 432. Meanwhile, the pre-reducing furnace 432 uses the reducing-gas of the melter-gasifier 410 to indirectly reduce the raw iron ore and the additives. The reduced iron thus produced is continuously discharged to be charged into the melter-gasifier 410.

In this method, however, the raw material can be used in the form of agglomerates (8–35 mm), and therefore, a limit is encountered in the raw material. That is, over 80% of the production of iron ore in the world is fine iron ore, but the above facility can use only lump iron ore and the expensive pellets, this being a serious disadvantage.

Meanwhile, U.S. Pat. No. 5,192,486 discloses a direct iron ore reducing apparatus which uses fine iron ore.

Figure 2:
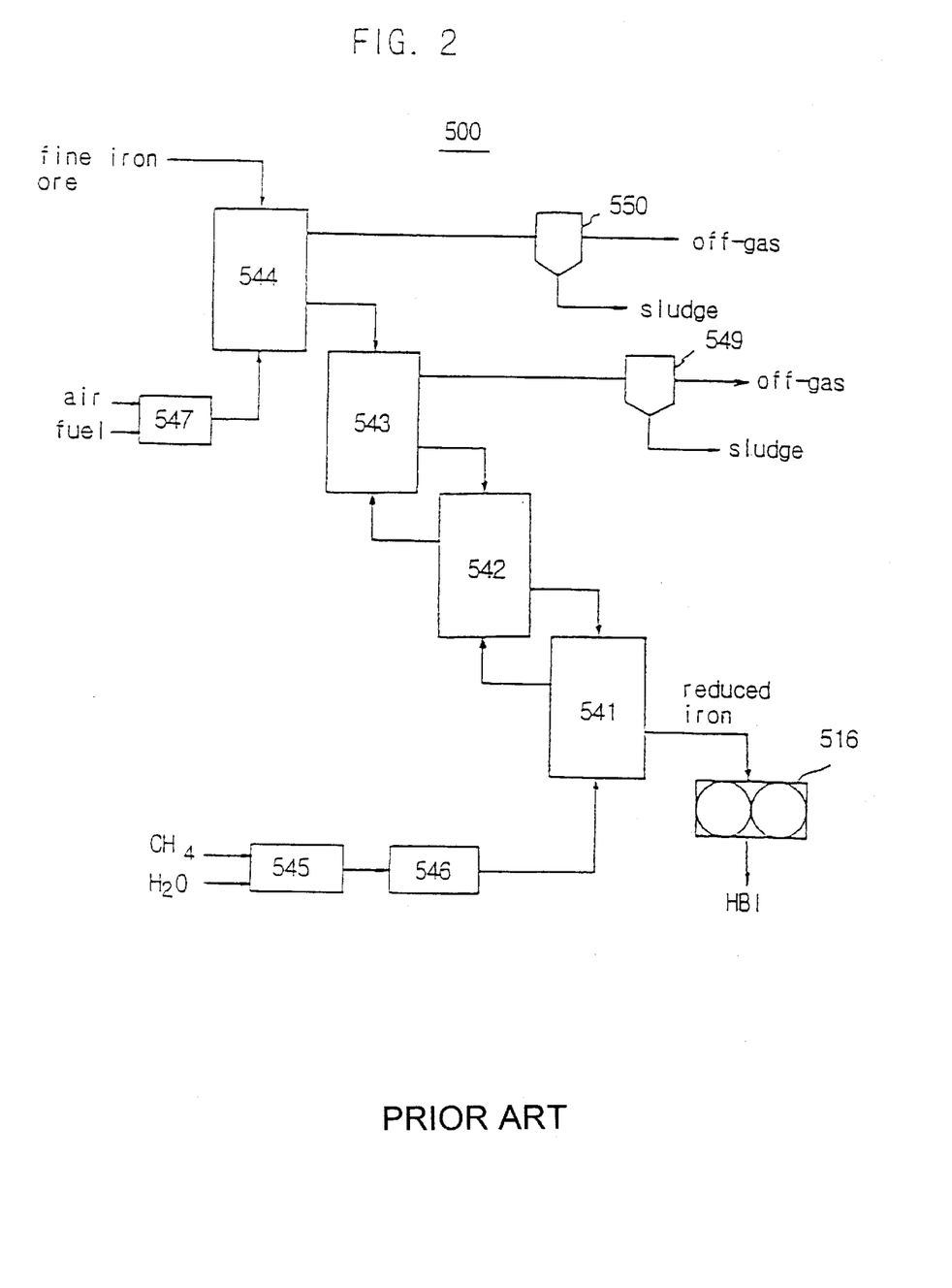
FIG. 2 is a schematic illustration of another conventional molten iron manufacturing apparatus.

As shown in FIG. 2, this apparatus 500 includes: a fluidized bed type pre-heating furnace 544 for pre-heating the iron ore by means of a hot air which has been heated by a combustion chamber 547; 3-stage reducing furnaces 541, 542 and 543; a gas reformer 545 for producing a reducing gas; a heat exchanger 546 for heating the gas reformer 545; gas cleaning scrubbers 549 and 550; and a briquetting device 516.

The gas reformer reforms a natural gas to produce a reducing gas for reducing the iron ore. Then the reformed gas is heated by the heat exchanger 546 to be supplied to a final reducing furnace 541. The reducing gas sequentially passes through a second pre-reducing furnace 542 and a first pre-reducing furnace 543 to be cleaned by the gas cleaning scrubber 549 so as to be circulated by going through the heat exchanger 546. The fine iron ore is fed into the pre-heating furnace to be pre-heated, and then, sequentially passes through the first pre-reducing furnace 543, the second pre-reducing furnace 542 and the final reducing furnace 541 to be finally reduced. The reduced iron is agglomerated by the briquetting device 516 into briquettes.

The above described facility uses natural gas, and requires 4-stage fluidized bed type furnaces. Thus the facility is extremely complicated, and therefore, the initial facility cost is high, while the operation is also very complex.

SUMMARY OF THE INVENTION

The present invention is intended to overcome the above described disadvantages of the prior art.

Accordingly the present invention provides an apparatus and a method for manufacturing molten iron by using a fine iron ore, in which coal is used to produce a reducing gas, and a fine iron ore is used to produce molten iron and reduced iron in a simple and efficient manner.

In achieving the above objective in part or in whole, the apparatus for manufacturing a molten iron by directly using coal as the fuel according to the present invention is characterized in that: a high temperature reducing gas is sent from a melter-gasifier to a fluidized bed lime stone calcining furnace to calcine lime stone; the reducing gas is supplied to a second fluidized bed reducing furnace so as to manufacture a reduced iron directly; an off-gas from the second fluidized bed reducing furnace is supplied to a first fluidized bed furnace (disposed above the second fluidized bed reducing furnace) to pre-heat and pre-reduce the fine iron ore; and the calcined lime stone and the Finally reduced iron are supplied to a melter-gasifier to manufacture a molten iron.

In another aspect of the present invention, the apparatus for manufacturing a molten iron by directly using coal as the fuel according to the present invention is characterized in that: a high temperature reducing gas is sent from a melter-gasifier to a fluidized bed lime stone calcining furnace to calcine lime stone; the reducing gas is supplied to a second fluidized bed reducing furnace so as to manufacture a reduced iron directly; and an off-gas from the second fluidized bed reducing furnace is supplied to a first fluidized bed furnace (disposed above the second fluidized bed reducing furnace) to pre-heat and pre-reduce the fine iron ore, thereby manufacturing a reduced iron.

In still another aspect of the present invention, the apparatus for manufacturing a molten iron by directly using coal as the fuel according to the present invention is characterized in that: a high temperature reducing gas of a melter-gasifier is sent to a third fluidized bed reducing furnace to finally reduce and calcine a fine iron ore and a fine additive; this reducing gas is supplied to a second fluidized bed reducing furnace to pre-reduce and calcine the fine iron ore and the fine additive for the second time; its off-gas is supplied to a first fluidized bed reducing furnace (disposed above the second fluidized bed reducing furnace) for pre-reducing and calcining the fine iron ore and the fine additive for the first time; and the calcined additive and the finally reduced iron are supplied to the melter-gasifier, thereby manufacturing a molten iron.

In still another aspect of the present invention, a method for manufacturing a molten iron by using the above apparatus is provided.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENTS

Figure 3:
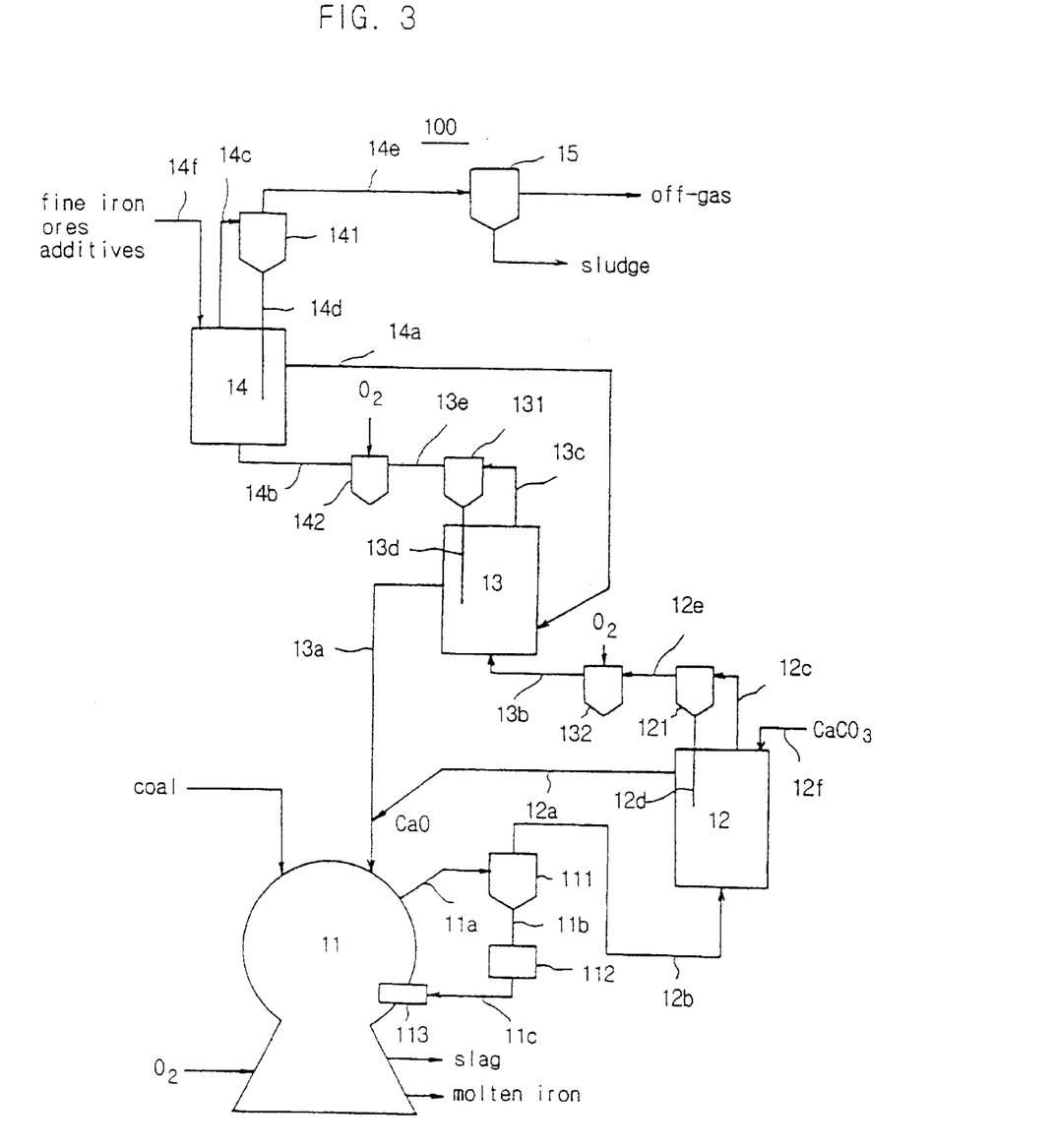
FIG. 3 is a schematic illustration of the molten iron manufacturing apparatus according to the present invention.

FIG. 3 is a schematic illustration of the molten iron manufacturing apparatus according to the present invention.

As shown in FIG. 3, the molten iron manufacturing apparatus 100 according to the present invention includes: a melter-gasifier 11 for gasifying coal and for melting a reduced iron ore; a third fluidized bed calciner 12 for calcining lime stone by using an off-gas of the melter-gasifier 11; a second fluidized bed reducing furnace 13 for indirectly reducing the fine iron ore; a first fluidized bed reducing furnace 14 for pre-heating and for pre-reducing the fine iron ore; a dust cyclone ill for sending dusts (separated from a reducing gas of the melter-gasifier 11) to a dust recycling device 112, and for supplying the off-gas (separated from the dusts) to the third fluidized bed calcining furnace 12; a melting burner 113 installed on the melter-gasifier 11, for delivering the fine dusts from the dust recycling device 112 into the melter-gasifier 11; and circulating cyclones 121, 131 and 141 for capturing the fine dusts from the off-gases of the first—third fluidized bed furnaces 12, 13 and 14 to re-circulate the dusts to the respective fluidized bed furnaces.

The apparatus according to the present invention preferably further includes: a venturi scrubber 15 for receiving the off-gas from the first circulating cyclone 141 of the first fluidized bed furnace 14 to capture residual dusts and to cool them; and/or second and first gas heaters 132 and 142 disposed upstream of the second fluidized bed furnace 13 and the first fluidized furnace 14 to receive oxygen and to heat the reducing gas.

A raw material supplying pipe 14f is connected to the first fluidized bed reducing furnace 14, for supplying a fine iron ore and an additive. The first fluidized bed reducing furnace 14 is connected through a first reduced iron discharge pipe 14a to the second fluidized bed reducing furnace 13 to supply the iron ore. Further, the furnace 14 is connected through a first gas supplying pipe 14b to the second fluidized bed furnace 13 to supply the gas. A first off-gas discharging pipe 14c is connected to the top of the furnace 14 to discharge the off-gas, and the pipe 14c is connected to the first circulating cyclone 141.

Further, the first fluidized bed reducing furnace 14 is connected through a firs. dust circulating pipe 14d to the first cyclone 141 to receive dusts.

The venturi scrubber 15 is connected through a second off-gas discharging pipe 14e to the first circulating cyclone 141.

The second fluidized bed reducing furnace 13 communicates through a second reduced iron discharging pipe 13a to the melter-gasifier 11. The furnace 13 communicates from its bottom through a second gas supplying pipe 13b to the third fluidized bed calciner 12 to receive a gas. A third off-gas discharging pipe 13c is connected to the top of the furnace 13 to discharge the off-gas. This off-gas discharging pipe 13c communicates to the second circulating cyclone 131.

A fourth off-gas discharging pipe 13e is connected through the first gas supplying pipe 14b to the second circulating cyclone 131, for supplying an off-gas to the first fluidized bed reducing furnace 14, with the off-gas separated from the dusts. A first gas heater 142 is installed between the first gas supplying pipe 14b and the fourth off-gas discharging pipe 13e.

Further, the second fluidized bed reducing furnace 13 is connected through a dust circulating pipe 13d to the second circulating cyclone 131 to receive dusts from it.

The third fluidized bed calcining furnace 12 is connected to a lime stone supplying pipe 12f which is connected to a lime stone source (not illustrated), for receiving lime stone. Further, the furnace 12 is connected to a quick lime discharging pipe 12a for discharging a calcined quick lime. The pipe 12a is connected to a second -reduced iron discharging pipe 13a. Therefore, the third fluidized bed calcining furnace 12 communicates through the quick lime discharging pipe 12a and the second reduced iron discharging pipe 13a to the melter-gasifier 11.

The third fluidized bed calcining furnace 12 is connected from its bottom through a third gas supplying pipe 12b to the dust cyclone 111 to receive gas. Further, a fifth off-gas discharging pipe 12c is connected to the top of the furnace 12 to discharge the gas, and the fifth off-gas discharging pipe 12c is connected to the third circulating cyclone 121.

The third circulating cyclone 121 is connected to a 6th off-gas discharging pipe 12e which is connected to the gas supplying pipe 13b, for supplying an off-gas to the second fluidized bed reducing furnace 13, in a state with the dusts separated from the gas. A second gas heater 132 is preferably installed between the second gas supplying pipe 13b and the 6th off-gas discharging pipe 12e.

The calcining furnace 12 is connected through a third dust circulating pipe 12d to a third circulating cyclone 121, to receive dusts.

A reducing gas discharging pipe 11a is connected to the melter-gasifier 11, while it also communicates with the dust cyclone 111. Therefore, the melter-gasifier 11 communicates with the dust cyclone 111 to supply gas.

The dust recycling device 112 communicates through a dust discharging pipe 11b with the dust cyclone 111 disposed in the above, and communicates through a dust injecting pipe 11c to a melting burner 113 which is installed on the melter-gasifier 11.

Figure 4:
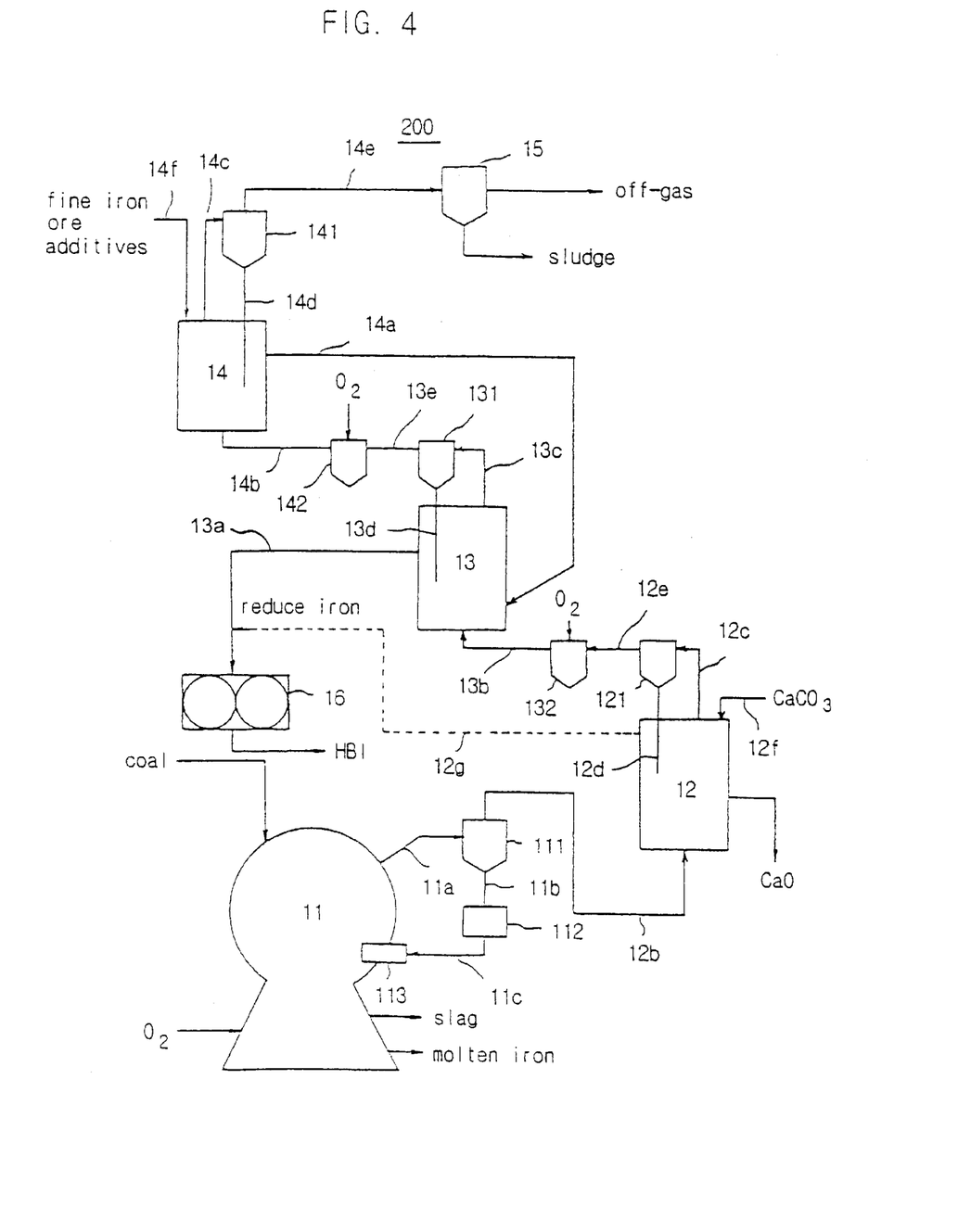
FIG. 4 is a schematic illustration of the reduced iron manufacturing apparatus according to the present invention.

FIG. 4 is a schematic illustration of the reduced iron manufacturing apparatus according to the present invention.

As shown in FIG. 4, the reduced iron manufacturing apparatus 200 is constituted such that the second reduced iron discharging pipe 13a so the second fluidized bed reducing furnace 13 is not connected to the melter-gasifier 11, but is made to communicate with the outside or communicates with a briquetting device 16, unlike the melting-reducing apparatus 100 of FIG. 3.

Further, unlike the melting-reducing apparatus 100 of FIG. 3, the reduced iron manufacturing apparatus 200 of the present invention is constituted such that the second reduced iron discharging pipe 13a of the second fluidized bed reducing furnace 13 is not connected to the melter-gasifier 11, but is made to communicate to the outside or communicates with a briquetting device 16. At the same time, a quick lime supplying pipe 12g is connected between the fluidized bed calcining furnace 12 and the briquetting device 16, for supplying a quick lime from the fluidized bed calcining furnace 12 to the briquetting device 16.

Figure 5:
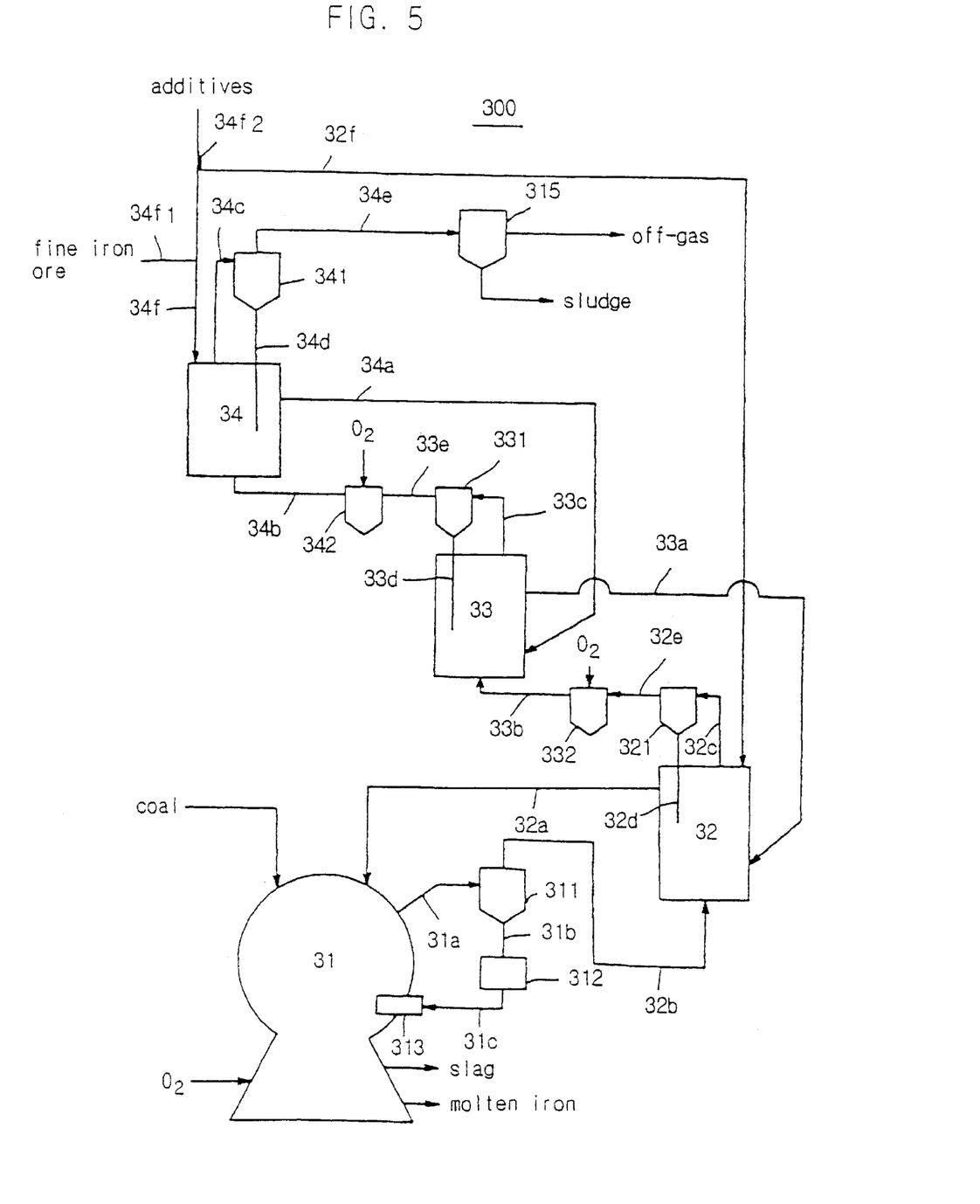
FIG. 5 is a schematic illustration of another embodiment of the molten iron manufacturing apparatus according to the present invention.

FIG. 5 is a schematic illustration of another embodiment of the molten iron manufacturing apparatus according to the present invention.

As shown in FIG. 5, the molten iron manufacturing apparatus 300 according to the present invention includes: a melter-gasifier 31 for gasifying a coal, and for melting a reduced iron; a third fluidized bed reducing furnace 32 for utilizing an off-gas of the melter-gasifier 31 to finally reduce a fine iron ore and to calcine a fine additive; a second fluidized bed reducing furnace 33 for pre-reducing the Fine iron ore and for calcining the fine additive for a second time; a first fluidized bed reducing furnace 34 for pre-reducing and calcining the fine iron ore and the fine additive for a first time; a dust cyclone 311 for sending dusts (separated from a reducing gas) from the melter-gas fire 31 to a dust recycling device 312, and for supplying an off-gas (separated from the dusts) to the third fluidized bed reducing furnace 32; a melting burner 313 installed on the melter-gasifier 31, for receiving fine dusts from the dust recycling device 312 to put them into the melter-gasifier 31; and circulating cyclones 321, 331 and 341 for capturing fine dusts from off-gases of the fluidized bed reducing furnaces 32, 33 and 34 to circulate them to the respective fluidized bed furnaces.

Preferably, the molten iron manufacturing apparatus according to the present invention further includes: a venturi scrubber 35 for receiving an off-gas from the first circulating cyclone 341 of the first fluidized bed reducing furnace 34 to capture residual dusts and to cool them; and/or first and second gas heaters 342 and 332 installed upstream of the first fluidized reducing furnace 34 and the second fluidized bed reducing furnace 33, for injecting oxygen to adjust the temperature of the reducing gas.

The first fluidized bed reducing furnace 34 is connected to a raw material supplying pipe 34f for receiving a fine iron ore and a fine additive.

The raw material supplying pipe 34f is connected to a first fine iron ore supplying pipe 34f1 which is connected to a fine iron ore source (not illustrated). Further, the pipe 34f is connected to a second additive supplying pipe 34f2 which is connected to an additive source (not illustrated).

The first fluidized bed reducing furnace 34 communicates through a first reduced iron discharging pipe 34a to the second fluidized bed reducing furnace 33 to send the iron ore. Further, the furnace 34 is connected from its bottom through a first gas supplying pipe 34b to the second fluidized bed reducing furnace 33 to receive gas. The furnace 34 is connected from its top to a first off-gas discharging pipe 34c to discharge an off-gas, and a first off-gas discharging pipe 34c is connected to the first circulating cyclone 341.

The fluidized bed reducing furnace 34 communicates through a first dust circulating pipe 34d to the first circulating cyclone 341 to circulate the dusts.

A venturi scrubber 35 is connected through a second off-gas discharging pipe 34e to the first circulating cyclone 341.

The second fluidized bed reducing furnace 33 communicates through a second reduced iron discharging pipe 33a to the third fluidized bed reducing furnace 32. The furnace 33 is connected from its bottom through a second gas supplying pipe 33b to the third fluidized bed reducing furnace 32, and its top is connected to a third off-gas discharging pipe 33c.

The third off-gas discharging pipe 33c communicates to the second circulating cyclone 331, and therefore, the second fluidized bed reducing furnace 33 communicates through a second dust circulating pipe 33d to the second circulating cyclone 331 to circulate the dusts.

The second circulating cyclone 331 is connected to a fourth off-gas discharging pipe 33e, and this pipe 33e is connected to the first gas supplying pipe 34b, for supplying an off-gas to the first fluidized bed reducing furnace 34 after the separation of the gas from fine dusts. Preferably, a first gas heater 342 is installed between the first gas supplying pipe 34b and the fourth off-gas discharging pipe 33e.

The third fluidized bed reducing furnace 32 is connected to a second additive supplying pipe 32f, and the pipe 32f is connected to a first additive supplying pipe 34f2 for supplying an additive such as lime stone or dolomite from an additive source (not illustrated).

The third fluidized bed reducing furnace 32 is connected to a third reduced iron discharging pipe 32a for sending a finally reduced iron and a calcined quick lime to the melter-gasifier 31, and the pipe 32a is connected to the melter-gasifier 31.

That is, the third fluidized bed reducing furnace 32 communicates through the third reduced iron discharging pipe 32a to the melter-gasifier 31.

Further, the third fluidized bed reducing furnace 32 is connected from its bottom through a third gas supplying pipe 32b to the dust cyclone 311 to receive a gas. The top of the furnace 32 is connected to a fifth off-gas discharging pipe 32c for discharging an off-gas. The pipe 32c is connected to the third circulating cyclone 321.

The third circulating cyclone 321 is connected to a 6th off-gas discharging pipe 32e, and this pipe 32e is connected to a second gas supplying pipe 33b, for supplying an off-gas to the second fluidized bed reducing furnace 33 after its separation from fine dusts. Preferably, a second gas heater 332 is installed between the second gas supplying pipe 33b and the 6th off-gas discharging pipe 32e.

Further, the third fluidized bed reducing furnace 32 communicates through a third dust circulating pipe 32d to the third circulating cyclone 321 to receive dusts.

The melter-gasifier 31 is connected to a reducing gas discharging pipe 31a, and the pipe 31a is connected to the dust cyclone 311. Therefore, the melter-gasifier 31 communicates with the dust cyclone 311 to send a gas.

The dust recycling device 312 communicates through a dust discharging pipe 31b to the dust cyclone 311, and is connected through a dust injecting pipe 31c to a melting burner 313 which is installed on the melter-gasifier 31.

Now the method for manufacturing a molten iron and a reduced iron by using the molten iron manufacturing apparatus and the reduced iron manufacturing apparatus of the present invention will be described.

This will be described referring to the apparatuses of FIGS. 3 and 4.

A fine iron ore and an additive having a particle size of 8 mm or less are charged into the first fluidized bed reducing furnace 14. Within the first fluidized bed reducing furnace 14, the charged fine iron ore is heated and pre-reduced by the reducing gas which is supplied from the second fluidized bed reducing furnace 13. Here, the fluidized bed should be preferably maintained at a temperature of 700–800° C. This is a condition for preventing the iron ore from being transformed from hematite ($Fe_2O_3$) to magnetite ($Fe_3O_4$). That is, if it is maintained below 650° C., the iron ore hematite is reduced after being transformed to magnetite. If the magnetite phase is formed and stabilized, the reduction speed is slowed, with the result that the required time is extended. Further, the gas utilization rate is lowered, and therefore, the fuel cost is increased. If the temperature is maintained above 800° C., the first gas heater 142 requires more oxygen, and the temperature of the supplied oxygen is excessively raised, with the result that a sticking problem may occur. Therefore, the most preferable temperature of the fluidized bed is about 780° C., or 750–800° C. If the supplied gas has too low a temperature, a proper amount of oxygen may be supplied to the first gas heater 142 to burn a part of the reducing gas, thereby adjusting the temperature of the fluidized bed. The reducing gas which is supplied to the first fluidized bed reducing furnace 14 has already undergone the reducing reaction within the second fluidized bed furnace 13, and therefore, it contains a considerable amount of $CO_2$, the gas oxidation ratio being about 20%–30%.

The pre-reduced iron ore which has been pre-reduced at a ratio of 30–50% within the first fluidized bed reducing furnace 14 is charged into the second fluidized bed reducing furnace 13. The second fluidized bed reducing furnace 13 uses a reducing gas having an oxidation ratio of 5–10%, which is supplied from the fluidized bed calcining furnace 12, so as to reduce the pre-reduced iron ore (supplied from the first fluidized bed reducing furnace 14) up to a reduction ratio of 90% or more, thereby manufacturing a finally reduced iron. Here, the fluidized bed within the reaction chamber should be preferably maintained at a temperature of about 850° C., or 830–870° C. If the temperature of the fluidized bed is lower than 830° C., the reduction ratio will be lowered. If the temperature of the fluidized bed is higher than 870° C., a sticking may occur due to the high temperature.

The reduced iron which has been reduced by the second fluidized bed reducing furnace 13 is either charged into the melter-gasifier 11 for forming molten iron, or is supplied to the high temperature briquetting device 16 for forming reduced iron briquettes as previously described with respect to FIG. 3 regarding the second reduced iron discharge pipe 13a.

The melter-gasifier 11 is charged with coal, and produces a reducing gas for reducing the iron ore and For calcining lime stone or dolomite. Under this condition, by utilizing the combustion heat, the fine reduced iron of the second fluidized bed reducing furnace 13 and the quick lime of the fluidized bed calcining furnace 12 can be melted together to produce molten iron. The melter-gasifier is a fixed bed type unlike the upper reducing furnaces and the calcining furnace, and therefore, in order to form a coal packed bed, the coal has to have a particle size of 8–50 mm in the amount of at least 80%. The melter-gasifier 11 may use the general soft coal, or under necessity, coke or anthracite (hard) coal. However, if the volatile organic substances contained in the soft coal are to be completely decomposed, the temperature of the off-gas of the melter-gasifier 11 has to be at least 1000° C. or above. If the temperature is lower than that, the organic material (tar) is not completely decomposed, the tar sinks at a low temperature region (such as a water treating device) to clog the flow lines. However, if the temperature is too much higher than the above specified level, then the fuel cost is increased, and therefore, the proper temperature range is 1000–1100° C. The reducing gas which is produced within the melter-gasifier 11 has a high temperature as described above, and therefore, it is too hot to be directly supplied to the second fluidized bed reducing furnace 13. That is, if the reducing gas is too hot, sticking occurs among the iron ores.

In order to solve this problem, the fluidized bed lime stone calcining furnace 12 is installed above the melter-gasifier. The calcination of lime stone chemically occurs as follows. $CO_2$ is dissociated from the lime stone $CaCO_3$ to form CaO, i. e., quick lime. This reaction requires heat, and therefore, in the present invention, the fluidized bed calcining furnace 12 not only manufactures the quick lime needed for manufacturing the molten iron, but also makes it possible to adjust the temperature of the reducing gas. The quick lime is an additive for separating the gangue of the iron ore into slag.

For example, when the coal is burned within the melter-gasifier 11, the amount of the reducing gas produced is about 1700–1800 $Nm^3$ per ton of molten iron, while the amount of heat to be released for lowering a gas from 1000–1100° C. to 900° C. is 80–120 Mcal per ton of molten iron. Meanwhile, when the lime stone ($CaCO_3$) is calcined to form quick lime (CaO), the amount of heat is required 430 Kcal per Kg of lime stone. About 360 Kg of lime stone is required to produce one ton of molten iron, and therefore, the amount of heat required for treating the additive is about 240 Mcal per ton of molten iron, if the calcination of the lime stone and the raising of the temperature of lime stone from the normal temperature to 900° C. are taken into account.

Therefore, about 30–50% of the additive for producing one ton of molten iron can be treated by the fluidized bed calcining furnace 12. The remaining 50–70% of the additive is charged into the first fluidized bed reducing furnace 14 to be calcined simultaneously with the reduction of the fine iron ore. The additive which has been calcined by the fluidized bed calcining furnace 12 is charged into the melter-gasifier 11 together with the reduced fine iron ore to produce molten iron and slag.

The temperature of the second fluidized bed reducing furnace 13 is adjusted optimally to about 850° C., and the first fluidized bed reducing furnace 14 is adjusted preferably to 780° C. In order to adjust and maintain the target temperatures stably, the second gas heater 132 and the first gas heater 142 are installed upstream of the respective reaction furnaces. The heat amount of the reducing gas, which is generated from the melter-gasifier 11 is about 3000 $Kcal/Nm^3$. The amount of heat for raising the temperature of the reducing gas by 100° C. is about 30 $Kcal/Nm^3$. Therefore, if an amount of the reducing gas which is discharged for producing one ton of molten iron is burned by 17–18 $Nm^3$ (1% of the reducing gas) of oxygen, the mentioned amount of the reducing gas can be raised by 100° C. Here, the required amount of oxygen is 8–9 $Nm^3$ per ton of molten iron. In this manner, if the amount of oxygen is adjustingly injected into the gas heater, the temperature can be raised to the required level.

Now the method for manufacturing a molten iron by using the apparatus of FIG. 5 will be described.

A fine iron ore and an additive having a particle size of 8 mm or less are charged respectively through the fine iron ore supplying pipe 34f1 and the first additive supplying pipe 34f2 into the raw material supplying pipe 34f. Then they are supplied through the raw material supplying pipe 34f into the first fluidized bed reducing furnace 34.

The fine additive which is supplied through the additive supplying pipe 34f2 and the raw material supplying pipe 34f should preferably amount to 50–70% of the total additive amount which is required for manufacturing the molten iron.

The fine iron ore which has been charged into the first fluidized bed reducing furnace 34 is pre-heated and pre-reduced by the reducing gas (i.e., the off-gas of the second fluidized bed reducing furnace 33) which is supplied after Dassing through the second fluidized bed reducing furnace 33, while the additive is calcined.

Under this condition, the temperature of the fluidized bed should be preferably maintained at 700–800° C. This is a condition for preventing the iron ore from being transformed from hematite ($Fe_2O_3$) to magnetite ($Fe_3O_4$). That is, if it is maintained below 650° C., the iron ore hematite is reduced after being transformed to magnetite. If the magnetite phase is formed and stabilized, the reduction speed is slowed, with the result that the required time is extended. Further, the gas utilization rate is lowered, and therefore, the fuel cost is increased. If the temperature is maintained above 800° C., the first gas heater 342 requires more oxygen, and the temperature of the supplied oxygen is excessively raised, with the result that a sticking problem may occur. Therefore, the most preferable temperature of the fluidized bed is different depending on the kind of the used fine iron ore, but should be about 720° C., or 700–750° C.

If the gas which is supplied to the first fluidized bed reducing furnace 34 has a low temperature, a proper amount of oxygen may be supplied to the first gas heater 342 to burn a part of the reducing gas, thereby adjusting the temperature of the fluidized bed. The reducing gas which is supplied to the First fluidized bed reducing furnace 34 has already undergone the reducing reaction within the second fluidized bed furnace 33, and therefore, it contains a considerable amount of $CO_2$, the gas oxidation ratio being about 30%–40%.

The pre-reduced iron ore which has been pre-reduced at a ratio of about 30% within the first fluidized bed reducing furnace 34 is charged into the second fluidized bed reducing furnace 33.

The second fluidized bed reducing furnace 33 uses a reducing gas having an oxidation ratio of 15–20%, which is supplied from the third fluidized bed reducing furnace 32 by way of conduit 32f shown in FIG. 5, so as to reduce the pre-reduced iron ore (supplied from the first fluidized bed reducing furnace 34) up to a reduction ratio of 50–60% for the second time. Under this condition, the temperature of the fluidized bed within the second fluidized bed reducing furnace 33 is preferably about 780° C., or 780–820° C.

The reducing gas which has been supplied to the second fluidized bed reducing furnace 33 has already been dropped to below 800° C., and therefore, the temperature can be utilized as it is.

However, in the case where the fluidized bed of the second fluidized bed reducing furnace 33 drops below 790° C., or where it is to be maintained at 800–820° C., oxygen may be injected into the second gas heater 332 to ultimately adjust the temperature of the fluidized bed to the optimum level.

If the temperature of the fluidized bed of the second fluidized bed reducing furnace 33 drops to below 780° C., there is the possibility that the reduction ratio of the pre-reduced iron to be outputted to the third fluidized bed reducing furnace 32 may be lowered, this being not desirable. The pre-reduced iron pre-reduced at a ratio of 50–60% and the calcined additive calcined for the second time, which are discharged from the second fluidized bed reducing furnace 33, are charged into the third fluidized bed reducing furnace 32.

The third fluidized bed reducina furnace 32 uses a reducing gas having an oxidation ratio of 3–7%, which is supplied from the melter-gasifier 31, so as to reduce the pre-reduced iron ore (supplied from the first fluidized bed reducing furnace 34) up to a reduction ratio of 90% or more, thereby manufacturing a finally reduced iron. Here, the fluidized bed within the third fluidized bed reducing furnace 32 should be preferably maintained at a temperature of about 850° C., or 830–870° C.

If the temperature of the fluidized bed is lower than 830° C., the reduction ratio will be lowered. If the temperature of the fluidized bed is higher than 870° C., a sticking may occur due to the high temperature.

In order to ensure the optimum temperature level of the fluidized bed, lime stone or dolomite as a temperature adjusting means is charged through the second additive supplying pipe 32f into the third fluidized bed reducing furnace 32.

The amount of the additive which is charged into the third fluidized bed reducing furnace 32 is the total amount of the additive needed for manufacturing the molten iron less the amount of the additive which has been already supplied into the first fluidized bed reducing furnace 31.

That is, the amount of the additive which is charged into the third fluidized bed reducing furnace 32 is equivalent to 30–50% of the total amount of the additive which is required for manufacturing the molten iron. This will be described more later.

The reduced iron and the calcined additive which have been finally reduced and calcined within the third fluidized bed reducing furnace 32 are charged into the melter-gasifier 31 so as to be manufactured into a molten iron.

Coal is charged into the melter-gasifier 31, so that the melter-gasifier 31 can produce a reducing gas. This reducing gas is used for reducing the raw fine iron ore, and for calcining the additive such as lime stone and dolomite. Further, the combustion heat thus produced is used for melting the finally reduced fine reduced iron and the finally calcined quick lime so as to manufacture a molten iron.

The melter-gasifier 31 is of a fixed bed type unlike the fluidized bed type reducing furnaces, and therefore, in order to form a coal packed bed, the coal has to have a particle size of 8–50 mm in the amount of at least 80%. The melter-gasifier 31 may use the general soft coal, or under necessity, coke or anthracite. However, if the volatile organic substances contained in the soft coal are to be completely decomposed, the temperature of the off-gas of the melter-gasifier 31 has to be at least 1000° C. or above. If the temperature is lower than this level, the organic material (tar) is not completely decomposed, the tar sinks at a low temperature region such as a water treating device to clog the flow lines. However, if the temperature is too much higher than the above specified one, then the fuel cost is increased, and therefore, the proper temperature range is 1000–1100° C. The reducing gas which is produced within the melter-gasifier 31 has a high temperature as described above, and therefore, it is too hot to be directly supplied to the third fluidized bed reducing furnace 32. That is, if the reducing gas is too hot, a sticking occurs among the iron ores.

In order to solve this problem in the present invention, a proper amount of the additive such as lime stone or dolomite is supplied into the third fluidized bed reducing furnace 32.

To take the additive lime stone as an example, the calcination of lime stone chemically occurs as follows. $CO_2$ is dissociated from the lime stone $CaCO_3$ to form Cao, i e, quick lime. This reaction requires heat, and therefore, in the present invention, the third fluidized bed reducing rurnace 32 not only manufactures the quick lime needed for manufacturing the molten iron, but also makes it possible to adjust the temperature of the reducing gas. The quick lime is an additive for separating the gangue of the iron ore into slag.

For example, when the coal is burned within the melter-gasifier 31, the amount of the reducing gas produced is about 1800 Nm$^3$ per ton of molten iron, while the amount of heat to be released for lowering a gas from 1050° C. to 850° C. is 120 Mcal per ton of molten iron.

Meanwhile, when the lime stone (CaCO$_3$) is calcined to form quick lime (CaO), the amount of heat required is 430 Kcal per Kg of lime stone. About 360 Kg of lime stone is required to produce one ton of molten iron, and therefore, the amount of heat required for treating the additive is about 240 Mcal per ton of molten iron, if the calcination of the lime stone and the raising of the temperature of lime stone from the normal temperature to 850° C. are taken into account. Meanwhile, the temperature of the pre-reduced iron which is discharged from the second fluidized bed reducing furnace 33 to be charged into the third fluidized bed reducing furnace 32 is about 780° C. Therefore, if the temperature is to be raised to 850° C., the amount of heat about 30 Mcal.

Therefore, about 30–50% of the additive for producing one ton of molten iron can be treated by the fluidized bed reducing furnace 32.

The remaining 50–70% of the additive is charged into the first fluidized bed reducing furnace 34 to be calcined simultaneously with the reduction of the fine iron ore during its passing through the second and third fluidized bed reducing furnaces 33 and 32.

The additive which has beer. calcined by the third fluidized bed reducing furnace 32 is charged into the melter-gasifier 31 together with the reduced fine iron ore to be separated into molten iron and slag.

The additive charging ratio between the first and third fluidized bed reducing furnaces 34 and 32 depends on the above specified temperature and the amount of the gas. This ratio also can be adjusted in accordance with the variation of the working conditions.

That is, the additive charging ratio is adjusted in such a manner that the temperatures of the respective fluidized bed furnaces are controlled to the above described optimum levels.

The temperature of the first fluidized bed reducing furnace 34 should be preferably 720° C., the temperature of the second fluidized bed reducing furnace 33 should be preferably 780° C., and the temperature of the third fluidized bed reducing furnace 32 should be preferably 850° C.

Actually therefore, in accordance with the properties of the coal and the fine iron ore, the reauired amount of the reducing gas can be varied within a range of 1500–1800 Nm$^3$ per ton of molten iron, and the temperature of the off-gas of the melter-gasifier 31 can be varied within a range of 1000–1100° C. Therefore, about 30–50% of the additive for producing one ton of molten iron is charged into the third fluidized bed reducing furnace 32 to carry out the temperature adjustment and the calcination. About 50–70% of the additive is charged into the first fluidized bed reducing furnace 34 so that it can be calcined simultaneously with the reduction of the fine iron ore while the passing through the second and third fluidized bed reducing furnaces 33 and 32.

Meanwhile, the temperatures of the second and first fluidized bed furnaces 33 and 34 may decrease below the target temperatures due to heat loss.

Therefore, in order to adjust and maintain the target temperatures at a stable level, the second gas heater 332 and the first gas heater 342 are preferably installed upstream of the second and first fluidized bed reducing furnaces 33 and 34.

For example, a simple control means for lowering the high temperature (1000° C.) of the reducing gas of the melter-gasifier to a proper temperature (850° C.) of the third fluidized bed reducing furnace 32 is achieved by supplying a part (40%) of the additive into the third fluidized bed reducing furnace 32, while a useful control means for raising the low temperatures of the second and first fluidized bed reducing furnaces to the optimum levels is obtained the gas heaters 332 and 342.

The amount of heat of the reducing gas, which is generated from the melter-gasifier 31, is about 3000 Kcal/Nm$^3$. The amount of heat required for raising the temperature of the reducing gas by 100° C. is about 30 Kcal/Nm$^3$. Therefore, if an amount of the reducing gas which is dischaged for producing one ton of molten iron is burned by 17–18 Nm$^3$ (1% of the reducing gas) of oxygen, the mentioned amount of the reducing gas can be raised by 100° C. Here, the required amount of oxygen is 8–9 Nm$^3$ per ton of molten iron. In this manner, if the amount of oxygen is adjustingly injected into the gas heater, the temperature can be raised to the required level.

According to the present invention as described above, coal is used for producing the reducing gas, and a fine iron ore is directly used. Thus, a molten iron or a reduced iron can be manufactured in a simple and efficient manner.

What is claimed is:

1. A molten iron manufacturing apparatus directly using coal as a fuel to manufacture molten iron, comprising:

a first fluidized bed reducing furnace for pre-heating and for pre-reducing a fine iron ore;

a second fluidized bed reducing furnace for indirectly reducing the fine iron ore;

a melter-gasifier for gasifying coal and for melting a reduced iron ore;

a third fluidized bed calcining furnace for calcining limestone by using an off-gas of said melter-gasifier;

first, second and third circulating cyclones for capturing fine dust from the off-gases of said first, second and third fluidized bed furnaces to recirculate said fine dust to said respective fluidized bed furnaces, a dust cyclone for sending dust separated from a reducing gas of said melter-gasifier to a dust recycling device, and for supplying the off-gas separated from the dust to said third fluidized bed calcining furnace;

a melting burner installed on said melter-gasifier, for spouting the fine dust from said dust recycling device into said melter-gasifier;

a venturi scrubber for receiving the off-gas from said first circulating cyclone of said first fluidized bed furnace to capture residual dust and to cool said off-gas and said residual dust;

a raw material supplying pipe connected to said first fluidized bed reducing furnace for supplying a fine iron ore and an additive; said first fluidized bed reducing furnace connected through a first reduced iron discharge pipe to said second fluidized bed reducing furnace for supplying the iron ore; said first furnace connected through a first gas supplying pipe to said second fluidized furnace for supplying the gas; a first off-gas discharging pipe connected to a top of said first furnace for discharging the off-gas; said pipe connected to said first circulating cyclone; and said first fluidized bed reducing furnace connected through a first dust circulating pipe to said first cyclone for receiving dust;

said venturi scrubber connected through a second off-gas discharging pipe to said first circulating cyclone;

said second fluidized bed reducing furnace communicating through a second reduced iron discharging pipe to said melter-gasifier; said second furnace communicating from its bottom through a second gas supplying pipe to said third fluidized bed calcining furnace for receiving a gas; a third off-gas discharging pipe connected to a top of said second furnace for discharging the gas; said off-gas discharging pipe communicating to said second circulating cyclone; and said second fluidized bed reducing furnace communicating through a second circulating pipe to said second circulating cyclone for receiving dust;

a fourth off-gas discharging pipe connected through said first gas supplying pipe to said second circulating cyclone for supplying an off-gas to said first fluidized bed reducing furnace, with the off-gas separated from the dust;

said third fluidized bed calcining furnace connected to a limestone supplying pipe which is connected to a limestone source for receiving limestone; said third furnace connected to a quick lime discharging pipe for discharging a calcined quick lime; said quick lime discharging pipe connected to said second reduced iron discharging pipe; said third fluidized bed calcining furnace connected from its bottom through a third gas supplying pipe to said dust cyclone for receiving a gas; a fifth off-gas discharging pipe connected to a top of said third furnace for discharging the gas; said fifth off-gas discharging pipe connected to said third circulating cyclone; and said calcining furnace connected through a third dust circulating pipe to said third circulating cyclone for receiving dust;

said third circulating cyclone connected to a sixth off-gas discharging pipe which is connected to said gas supplying pipe for supplying an off-gas to said second fluidized bed reducing furnace in a state with the dust separated from the gas; and a reducing gas discharging pipe communicating with said dust cyclone and connected to said melter-gasifier; a second reduced iron discharge pipe communicating with said second fluidized bed reducing furnace and connected to said melter-gasifier; said dust recycling device connected through a dust discharging pipe to said dust cyclone; and said dust recycling device communicating with a dust injecting pipe to a melting burner which is installed on said melter-gasifier.

2. The molten iron manufacturing apparatus as claimed in claim 1, wherein a first gas heater and a second gas heater are installed respectively between said first gas supplying pipe and said fourth off-gas discharging pipe and between said second gas supplying pipe and a sixth off-gas discharging pipe.

3. A reduced iron manufacturing apparatus directly using coal as a fuel to manufacture reduced iron, comprising:

a first fluidized bed reducing furnace for pre-heating and for pre-reducing a fine iron ore;

a second fluidized bed reducing furnace for indirectly reducing the fine iron ore;

a melter-gasifier for gasifying coal and for melting a reduced iron ore;

a third fluidized bed calcining furnace for calcining limestone by using an off-gas of said melter-gasifier;

first, second and third circulating cyclones for capturing fine dust from the off-gases of said first, second and third fluidized bed furnaces to recirculate said fine dust to said respective fluidized bed furnaces;

a dust cyclone for sending dust separated from a reducing gas of said melter-gasifier to a dust recycling device, and for supplying the off-gas separated from the dust to said third fluidized bed calcining furnace;

a melting burner installed on said melter-gasifier, for spouting the fine dust from said dust recycling device into said melter-gasifier;

a venturi scrubber for receiving the off-gas from said first circulating cyclone of said first fluidized bed furnace to capture residual dust and to cool said off-gas and said residual dust;

a raw material supplying pipe connected to said first fluidized bed reducing furnace for supplying a fine iron ore and an additive; said first fluidized bed reducing furnace connected through a first reduced iron discharge pipe to said second fluidized bed reducing furnace for supplying the iron ore; said first furnace connected through a first gas supplying pipe to said second fluidized furnace for supplying the gas; a first off-gas discharging pipe connected to a top of said first furnace for discharging the off-gas; said pipe connected to said first circulating cyclone; and said first fluidized bed reducing furnace connected through a first dust circulating pipe to said first cyclone for receiving dust;

said venturi scrubber connected through a second off-gas discharging pipe to said first circulating cyclone;

said second fluidized bed reducing furnace communicating through a second reduced iron discharging pipe to said melter-gasifier; said second furnace communicating from its bottom through a second gas supplying pipe to said third fluidized bed calcining furnace for receiving a gas; a third off-gas discharging pipe connected to a top of said second furnace for discharging the gas; said off-gas discharging pipe communicating to said second circulating cyclone; and said second fluidized bed reducing furnace communicating through a second circulating pipe to said second circulating cyclone for receiving dust;

a fourth off-gas discharging pipe connected through said first gas supplying pipe to said second circulating cyclone for supplying an off-gas to said first fluidized bed reducing furnace, with the off-gas separated from the dust;

said third fluidized bed calcining furnace connected to a limestone supplying pipe which is connected to a limestone source for receiving limestone; said third furnace connected to a quick lime discharging pipe for discharging a calcined quick lime; said quick lime discharging pipe connected to said second reduced iron discharging pipe; said third fluidized bed calcining furnace connected from its bottom through a third gas supplying pipe to said dust cyclone for receiving a gas; a fifth off-gas discharging pipe connected to a top of said third furnace for discharging the gas; said fifth off-gas discharging pipe connected to said third circulating cyclone; and said calcining furnace connected through a third dust circulating pipe to said third circulating cyclone for receiving dust;

said third circulating cyclone connected to a sixth off-gas discharging pipe which is connected to said gas supplying pipe for supplying an off-gas to said second fluidized bed reducing furnace in a state with the dust separated from the gas; and a reducing gas discharging pipe communicating with said dust cyclone and connected to said melter-gasifier; a second reduced iron discharge pipe communicating with said second fluidized bed reducing furnace and connected to one of an outside depository or a briquetting device for manufacturing reduced iron briquettes; said dust recycling device connected through a dust discharging pipe to said dust cyclone; and said dust recycling device communicating with a dust injecting pipe to a melting burner which is installed on said melter-gasifier.

4. The reduced iron manufacturing apparatus as claimed in claim 3, wherein a quick lime supplying pipe is installed between a fluidized bed calcining furnace and said briquetting device for supplying quick lime after calcination of limestone within said fluidized bed reducing furnace.

5. The reduced iron manufacturing apparatus as claimed in claim 4, wherein a first gas heater and a second gas heater are installed respectively between said first gas supplying pipe and said fourth off-gas discharging pipe, and between said second gas supplying pipe and said six th off-gas discharging pipe.

6. The reduced iron manufacturing apparatus as claimed in claim 3, wherein a first gas heater and a second gas heater are installed respectively between said first gas supplying pipe and said fourth off-gas discharging pipe, and between said second gas supplying pipe and said sixth off-gas discharging pipe.

7. A molten iron manufacturing apparatus for manufacturing molten iron by directly using coal as a fuel, comprising:

a first fluidized bed reducing furnace for pre-reducing and calcining a fine iron ore and a fine additive for a first time;

a second fluidized bed reducing furnace for pre-reducing the fine iron ore and for calcining the fine additive for a second time;

a third fluidized bed reducing furnace for receiving the fine iron ore and the fine additive reduced and calcined for a second time by said second fluidized bed reducing furnace, and for receiving an additional fine additive in addition to those from said first fluidized bed reducing furnace, and for utilizing an off-gas of said melter-gasifier to finally reduce the fine iron ore and to finally calcine the fine additive;

a melter-gasifier for receiving the finally pre-reduced fine iron ore and the finally calcined additive from said third fluidized bed reducing furnace to melt and reduce them so as to manufacture a molten iron;

a dust cyclone for sending dust separated from a reducing gas from said melter-gasifier to a dust recycling device and for supplying an off-gas separated from the dust to said third fluidized bed reducing furnace;

a melting burner installed on said melter-gasifier for receiving fine dust from said dust recycling device to spout the fine dust into said melter-gasifier;

first, second and third circulating cyclones for capturing fine dust from off-gases of said fluidized bed reducing furnaces to circulate said fine dust back to said respective fluidized bed furnaces;

a venturi scrubber for receiving an off-gas from said first circulating cyclone of said first fluidized bed reducing furnace to capture residual dust and to cool said dust and off-gas;

said first fluidized bed reducing furnace connected to a raw material supplying pipe for receiving a fine iron ore and a fine additive; said raw material supplying pipe connected to a fine iron ore supplying pipe which is connected to a fine iron ore source; said pipe also connected to a first additive supplying pipe which is connected to an additive source; said first fluidized bed reducing furnace communicating through a first reduced iron discharging pipe with said second fluidized bed reducing furnace for sending the iron ore; said first furnace connected from its bottom through a first gas supplying pipe to said second fluidized bed reducing furnace for receiving gas; said first furnace connected from its top to a first off-gas discharging pipe for discharging an off-gas; a first off-gas discharging pipe being connected to said first circulating cyclone; and said first fluidized bed reducing furnace communicating through a first dust circulating pipe with said first circulating cyclone for circulating the dust;

a venturi scrubber connected through a second off-gas discharging pipe to a first of said circulating cyclones;

said second fluidized bed reducing furnace communicating through a second reduced iron discharging pipe to said third fluidized bed reducing furnace; said second furnace connected from its bottom through a second gas supplying pipe to said third fluidized bed reducing furnace; said second furnace connected from its top to a third off-gas discharging pipe; said third off-gas discharging pipe communicating with a second of said circulating cyclones; and said second fluidized bed reducing furnace communicating through a second dust circulating pipe to said second circulating cyclone for circulating the dust;

said second circulating cyclone connected to a fourth off-gas discharging pipe, and this pipe being connected to said first gas supplying pipe for supplying an off-gas to said first fluidized bed reducing furnace after separation of the off-gas from the fine dust;

said third fluidized bed reducing furnace connected to a second additive supplying pipe; said pipe connected to a first additive supplying pipe for supplying an additive from an additive source; said third fluidized bed reducing furnace connected to a third reduced iron discharging pipe for sending a finally reduced iron and a calcined quick lime; said pipe connected to said melter-gasifier; said third fluidized bed reducing furnace connected from its bottom through a third gas supplying pipe to said dust cyclone for receiving a gas; said third furnace connected from its top to a fifth off-gas discharging pipe for discharging an off-gas; said pipe connected to said third circulating cyclone; and said third fluidized bed reducing furnace connected through a dust circulating pipe to said third circulating cyclone;

said third circulating cyclone connected to a sixth off-gas discharging pipe, and this pipe connected to a second gas supplying pipe for supplying an off-gas to said second fluidized bed reducing furnace after separation of said off-gas from the fine dust; and said melter-gasifier connected to a reducing gas discharging pipe; said pipe connected to said dust cyclone; and said dust recycling device communicating through a dust discharging pipe to said dust cyclone, and connected through a dust injecting pipe to a melting burner which is installed on said melter-gasifier.

8. The molten iron manufacturing apparatus as claimed in claim 7, wherein a first gas heater and a second gas heater are installed respectively between said first gas supplying pipe and said fourth off-gas discharging pipe, and between said second gas supplying pipe and a sixth off-gas discharging pipe.

* * * * *